Jan. 20, 1925.
A. H. DODGE
1,524,005
LOCKING MEANS FOR DOORS
Filed April 10, 1924
4 Sheets-Sheet 1
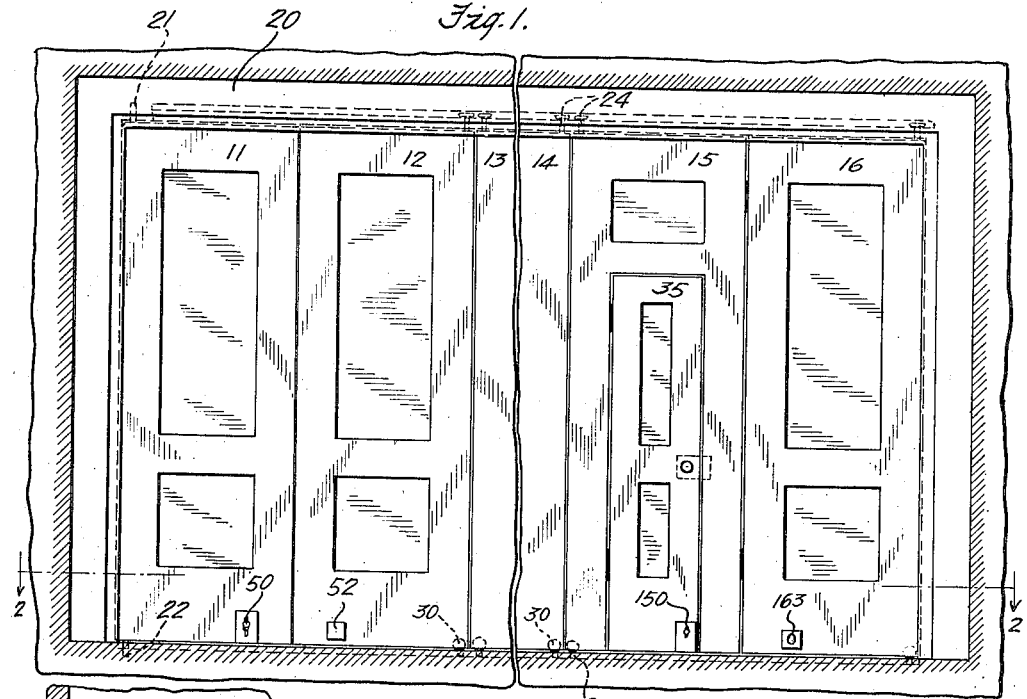
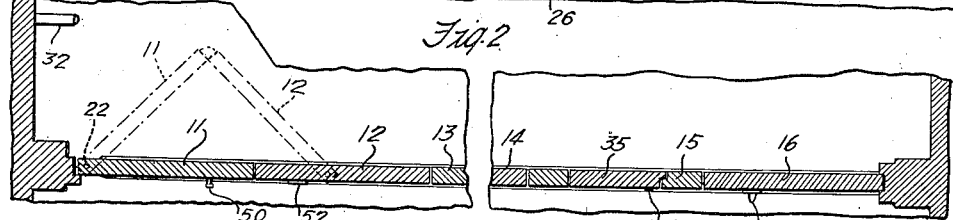
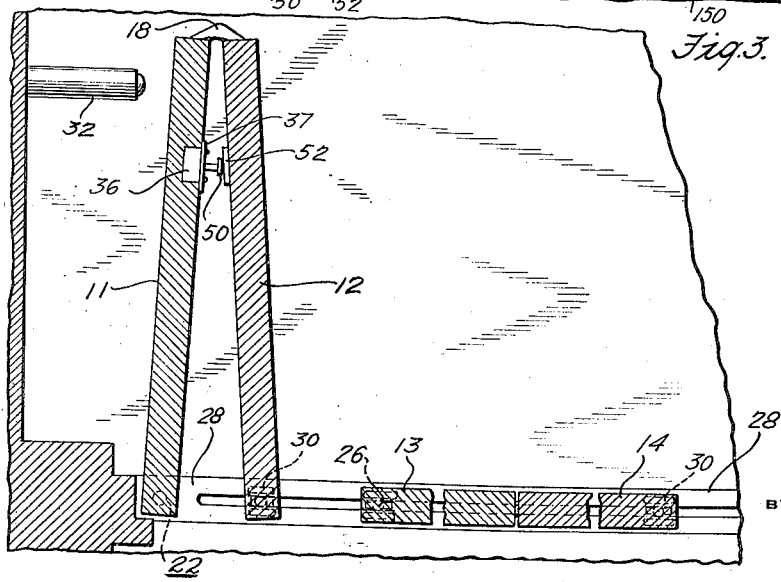
INVENTOR
Arthur H. Dodge
BY
ATTORNEYS Jan. 20. 1925.                                                                1,524,005
A. H. DODGE
LOCKING MEANS FOR DOORS
Filed April 10, 1924                  4 Sheets-Sheet 2
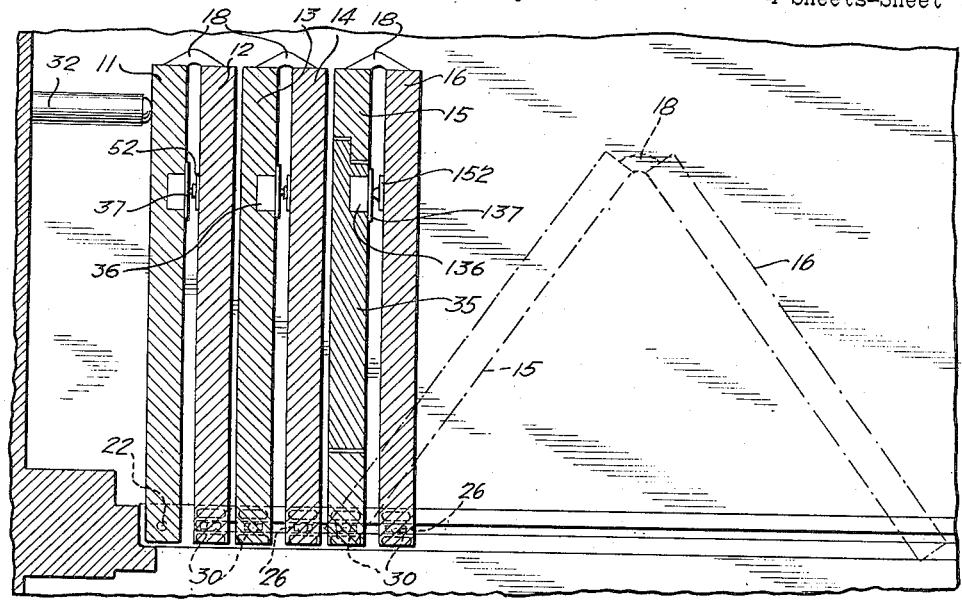
Fig. 4.
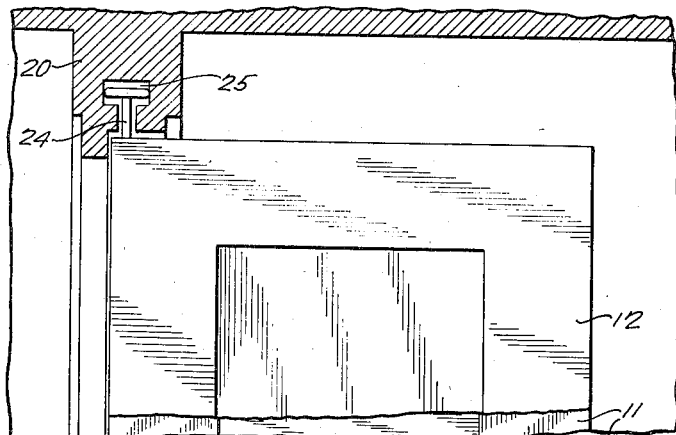
Fig. 5.
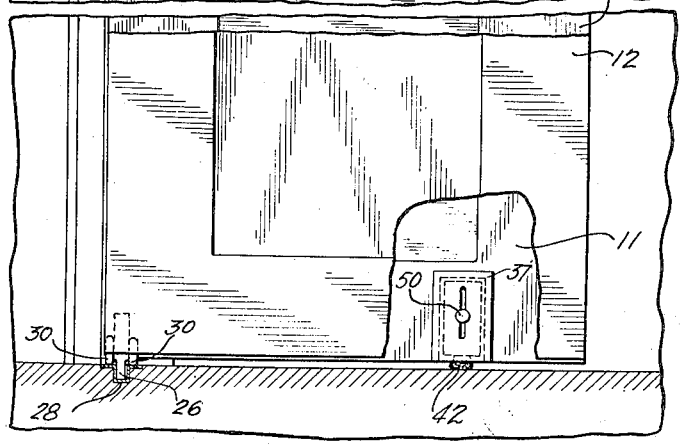
INVENTOR
Arthur H. Dodge
BY Newell & Spencer
ATTORNEYS Jan. 20, 1925.  1,524,005
A. H. DODGE
LOCKING MEANS FOR DOORS
Filed April 10, 1924   4 Sheets-Sheet 3

INVENTOR
Arthur H. Dodge
BY
ATTORNEYS

Jan. 20, 1925.  1,524,005
A. H. DODGE
LOCKING MEANS FOR DOORS
Filed April 10, 1924  4 Sheets-Sheet 4

INVENTOR
Arthur H. Dodge
BY Newell & Spencer
ATTORNEYS

Patented Jan. 20, 1925.

1,524,005

UNITED STATES PATENT OFFICE.

ARTHUR H. DODGE, OF NEW YORK, N. Y., ASSIGNOR TO THE J. G. WILSON CORPORATION, OF NEW YORK, N. Y., A CORPORATION OF VIRGINIA.

LOCKING MEANS FOR DOORS.

Application filed April 10, 1924. Serial No. 705,468.

*To all whom it may concern:*

Be it known that I, ARTHUR H. DODGE, a citizen of the United States, residing at New York city, New York, have invented a certain new and useful Improvement in Locking Means for Doors, of which the following is a clear, full, and exact description.

This invention relates to locking means for doors, and particularly to means for locking folding doors in their open position.

In operating folding doors of the type in which the doors fold to one side of their position when closed and have their normally remote edges guided in upper and lower tracks, it is important to protect such doors against attempts of people unfamiliar with their operation to swing them into closed position about their track connections instead of sliding the doors along the tracks in the intended manner. Because of the good leverage provided in this type of doors, it is comparatively easy for people who attempt to close the doors by taking hold of the hinged edges instead of the edge guided in the tracks to break the track connections and thus render the door inoperative.

It is an object of my invention to provide means to maintain a folding door, particularly of the aforementioned type, in its open position until the outer section thereof is moved outwardly along its track.

My invention will prove particularly useful when employed with doors forming partitions which divide lecture rooms, banquet halls, ball rooms, and the like, for in such cases attempts to close the door will frequently be made by persons who are unfamiliar with their construction or operation and who will in most cases grasp the hinged edges of the doors to close the same. By providing means to lock a folding door in its folded or open position and to hold it immovable until the outer one of a folded pair of sections is moved along its track not only will the strain caused by the improper closing of the door be prevented, but the unauthorized closing of such doors will be largely prevented. Those, however, who are authorized to close the doors and are familiar with their operation may readily close the same by grasping the outward section thereof at its edge adjacent to the track and moving it outwardly along the track so as to automatically release the locking means.

Other objects, features, and advantages of the invention will be disclosed in the following description taken in connection with the accompanying drawings, which show certain embodiments of the invention.

Fig. 1 of the drawings is a front view of a folded partition in its closed or drawn out position;

Fig. 2 is a sectional view thereof through the lines 2—2 in Fig. 1;

Fig. 3 is a top cross sectional view showing one pair of sections in a partially folded position;

Fig. 4 is a top cross sectional view showing the sections in their open, completely-folded position;

Fig. 5 is a side view of a pair of sections in their folded position and shows the track therefor and the locking means in its operative position;

Figure 6:
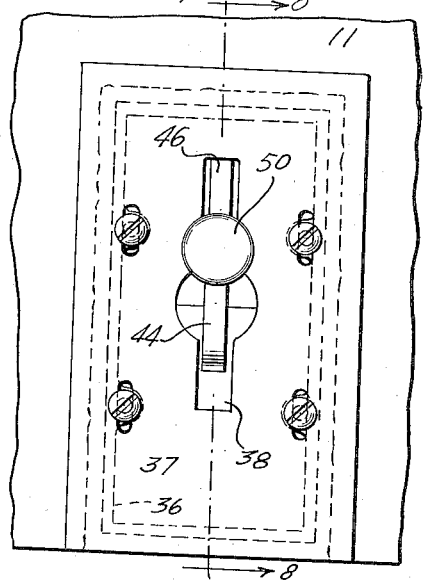
Fig. 6 is a side view of one type of locking means.

The folding door shown in the drawings consists of a partition comprising a plurality of sections 11, 12, 13, 14, 15, and 16. Sections 11, 13, and 15 are joined at one edge to the corresponding edge of sections 12, 14, and 16, respectively, by hinges 18 which may be of any known type. The innermost section 11 is rotatably mounted on a stationary fixture 20 on the wall or ceiling of the room by means of a pin 21, and on the floor of the room by means of a pin 22. The corresponding edges of sections 12 through 16 carry at their top attachments 24 which fit into a track 25 in the fixture 20, and carry in their base guides 26 which fit in a track 28 in the floor and rollers 30 which bear upon the floor. When the section 11 is mounted at a distance from the wall of the room, as shown in the figures, it is desirable to provide a stop 32 to limit the rotation of the section 11 in the direction of the wall so as to cause the operation of the locking mechanism when sections 11 and 12 are substantially at right angles to the tracks. The partition is closed by unfolding the pair of sections 15, 16 and sliding them outwardly along the tracks 25 and 28, by unfolding sections 13 and 14 and sliding them outwardly and by unfolding sections 11 and 12. A small door 35 is provided in section 15 to allow a person to pass through the partition when closed without moving the sections thereof.

A large variety of locking means may be employed in connection with the folding doors illustrated. Two such varieties are shown in the drawings, both of which comprise a toggle-operated plunger in the base of the inner section of each pair of sections. In the arrangement shown in Figs. 6 through 9, the toggle projects from the side of the inner section of a pair and extends outwardly a distance greater than the space between the sections when they are folded. This arrangement, which is simple and generally satisfactory, is shown on sections 11 and 13. In certain cases it is desirable to use an arrangement in which the head of the toggle does not project greatly beyond the surface of the door, in order for example, that it will not catch in the clothing of persons passing near it. Such an arrangement is illustrated in Figs. 10 through 14 and is shown upon the small door 35 in section 15 where it will be preferable to use some such arrangement in view of the small size of door 35 and of the number of persons who are likely to pass therethrough.

Figure 7:
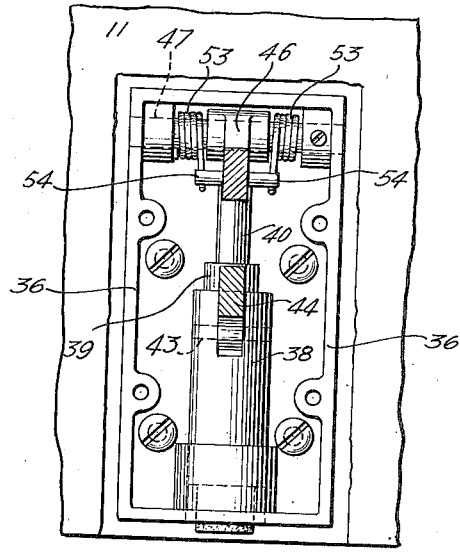
Fig. 7 is a similar view with the face plate removed to reveal the mechanism.
Figure 8:
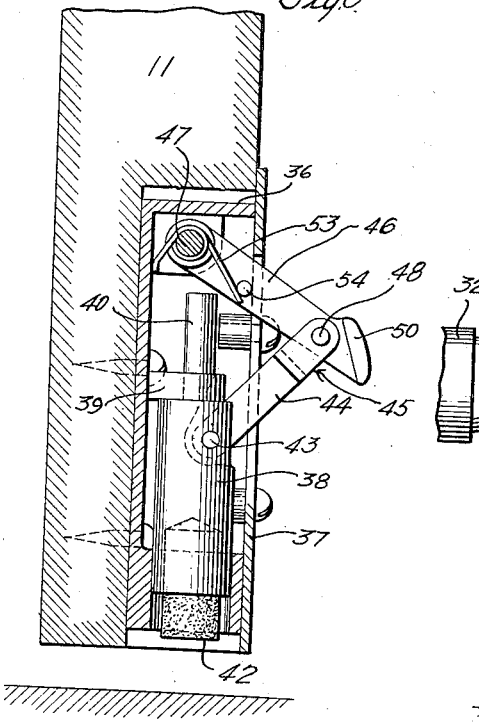
Fig. 8 is a side view through the lines 8—8, Fig. 6.
Figure 9:
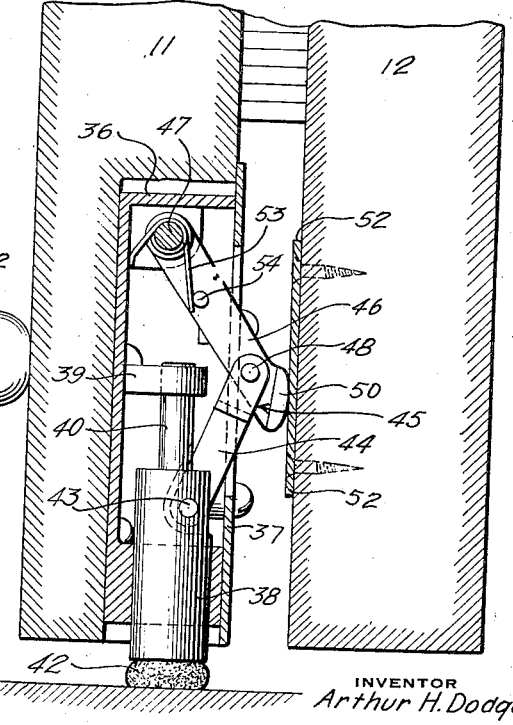
Fig. 9 is a view similar to Fig. 8 showing the locking means in its operative position.
Figure 10:
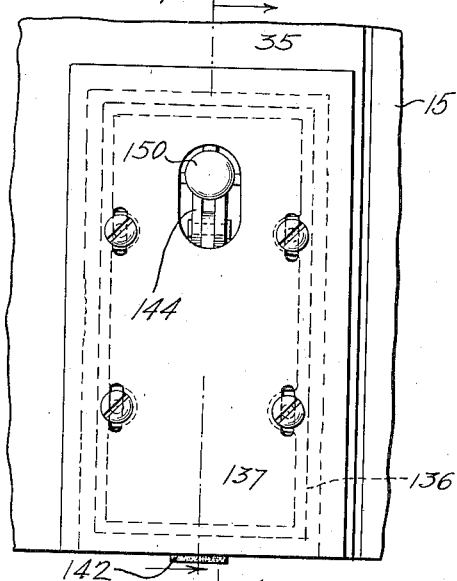
Figs. 10 through 13 are views corresponding to those shown in Figures 6 through 9 and illustrate an alternative type of locking means.
Figure 11:
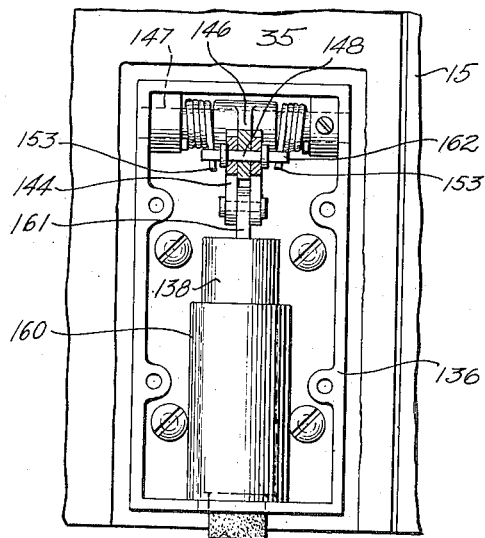
Figure 12:
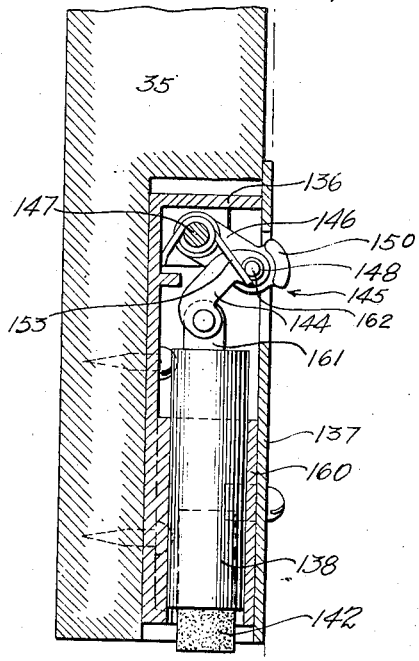

Figures 6 through 9 show a housing 36 which is set in the base and towards the hinged edge of the inner section 11 of the pair of sections 11, 12. On the front of the housing is a face plate 37, and in the bottom of the housing is an opening through which projects a plunger 38 held in place by the sides of the opening and by a guide 39 for the reduced upper end 40 of the plunger. Into a hollow in the bottom of the plunger is fitted a piece of rubber 42 or other frictional floor engaging member. One arm 44 of a toggle 45 extends into a cut in the side of the plunger and is pivotally fastened thereto by a shaft 43. The other arm 46 of the toggle is rotatably mounted upon a shaft 47 which is fixed in the housing. Arms 44 and 46 extend outwardly through an opening in the face plate 37 and are pivotally joined by a rivet 48. At the vertex or head of the toggle the arm 46 is extended beyond rivet 48 and is flattened at its end so as to form a bearing surface 50. A bearing plate 52 is fastened on section 12 in such position that it will bear against surface 50 and operate the toggle 45 when the sections 11 and 12 are folded together. A spring 53 fixed on shaft 47 bears against a pin 54 extending through arm 46 so as to normally thrust the vertex of the toggle outwardly and keep the plunger 38 in its raised position, as shown in Figures 7 and 8. As the partition is opened, section 12 will be slid along track 25 and sections 11 and 12 will be folded back until they reach the position shown in Fig. 3, at which time bearing plate 52 will touch the bearing surface 50 on arm 46. As the sections are pushed to their completely folded position in which section 11 rests against stop 32 as shown in Fig. 4, bearing plate 52 will press on the arm 46 so as to straighten out the toggle overcome the effect of spring 53, and to thrust the plunger downwardly. As the plunger is thrust downwardly, friction member 42 will bear against the floor and when the doors are in their completely folded position, will bear against the floor with sufficient force to lock section 11 firmly against the floor. The stop 32 is preferably positioned so that, during the movement of section 12 relatively to section 11 after the latter section engages the stop, the top attachment 24 and the base guide 26 on the section 12 will wedge slightly against one side of the tracks, thereby holding the section 12 in position to maintain the section 11 locked. Section 11 can then be released only by the movement of section 12 outwardly along the track; thus insuring against the closing or unfolding of the sections from their hinged edges. The outward movement of section 12 carries bearing plate 52 away from the toggle 45, which is forced outwardly by spring 53 so as to reduce the pressure of the friction member 42 against the floor. The friction member may be easily then be drawn across the floor and the sections moved to the position shown in Fig. 3, at which time the toggle and the plunger will have been returned to the position of Fig. 8. Section 13 may be locked and released by the movements of section 14 in a similar manner.

Figure 13:
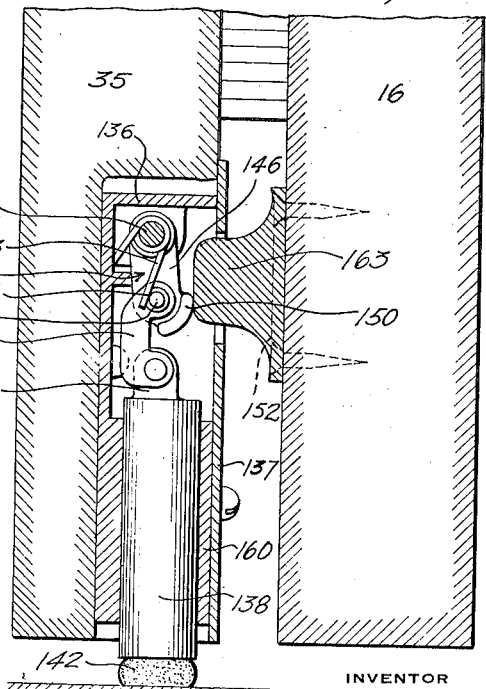
Figure 14:
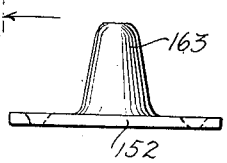
Fig. 14 is a top view of the bearing plate shown in Fig. 13.

The locking means for section 15 is shown in Figs. 10 through 14, and comprises a housing 136, a face plate 137, a plunger 138, a rubber friction member 142, a toggle 145, arms 144 and 146, a shaft 147, rivet 148, bearing surface 150, a bearing plate 152, and a spring 153, which corresponds to members 36, 37, 38, 42, 45, 44, 46, 47, 48, 50, 52 and 53 described above. Toggle 145 is considerably smaller than toggle 45 and projects very little beyond the surface of face plate 137. Plunger 138 is held in place by a long guide member 160 in the bottom of the housing and has an upward extension 161 therefrom, to which arm 144 is pivotally attached. Spring 153 bears against extensions 162 on the rivet 148. Bearing plate 152 on sections 16 has a projection 163 therefrom which is in line with the bearing surface 150 and which is of sufficient length so that when sections 15 and 16 are in the position shown in Fig. 4, the toggle 145 will be pressed inwardly and the plunger 138 downwardly, as is shown in Fig. 13. The construction and operation of this locking means is similar in every other respect to that of the locking means shown in Figs. 6 through 9.

It should be noted that the term "door" as used herein is employed in its broadest meaning and denotes any member or members adapted to extend across or partially across a room or any opening in the walls thereof.

The invention is of course, not limited to the particular embodiments thereof described above.

What I claim as new is:

1. In a folding door, a plurality of sections and locking means for one of the sections adapted to be locked by pressure applied thereto by another of said sections and to be released as said pressure is removed.

2. In a folding door, a plurality of sections, means for supporting each of said sections at a certain point in its width for pivotal movement and for movement in the plane of the doorway, and means carried by one of said sections adapted to lock the same against transverse movement at a point remote from its point of support in response to a movement of another of said sections to be released by a second movement of said other section.

3. In a folding door, a plurality of sections, means for supporting each of said sections at a certain point in its width for pivotal movement and for movement in the plane of the doorway, and means to lock one of said sections against transverse movement at a point remote from its point of support in response to a folding movement of certain of said sections and to release the locked section in response to an unfolding movement of the folded sections.

4. In a folding door, a pair of hinged sections, means for movably supporting said sections at points remote from their hinged edges, and means operative when said sections are folded and adapted to be rendered inoperative by the unfolding thereof for preventing a substantial movement of the hinged edges of said sections.

5. The combination with a folding door comprising a plurality of pivotally supported sections, of means for locking one section against a swinging movement on its pivotal supports, as an adjacent section is folded toward it and for releasing the locked section to allow the section to execute said swinging movement in response to an unfolding movement of said folded sections.

6. In combination with a folding door comprising a plurality of sections, a fixed element adjacent to which said sections are arranged to swing, and means comprising a contact element mounted on and movable relatively to one of said sections and arranged to engage said fixed element to lock said one section in its folded position in response to the folding movement of another of said sections.

7. In a folding door, a plurality of sections, means to lock one of said sections in its folded position as an adjacent section is folded toward it, and means to limit the folding movement of the section to be locked so as to cause the operation of said locking means.

8. In combination, a folding door comprising a pair of hinged sections, a fixed element adjacent to which said sections are arranged to swing, locking means comprising a contact element mounted on one of said sections, means for causing the contact element to engage the fixed element as said sections are folded together and means to limit the folding movement of said sections so as to cause the operation of said locking means.

9. In a folding door, a plurality of sections, a plunger carried by one of said sections, and means for pressing the plunger outwardly into locking engagement with the surface of a stationary member in response to pressure applied to said means by the movement of another of the door sections.

10. In a folding door, a plurality of sections, a toggle on one of said sections and adapted to project toward an adjacent section as the two sections are folded together, a plunger connected with one end of the toggle, and means on the plunger for engaging the floor over which the door moves in response to pressure applied to the toggle by said adjacent section as the two sections are folded.

11. In a folding door, a plurality of sections, locking means carried by one of the sections for locking the same in its folded position and a projecting pressure element mounted on an adjacent section for actuating said locking means.

12. In a folding door, a plurality of sections, locking means carried by one of the sections and comprising a pivoted lever, and a projecting pressure element mounted on an adjacent section so as to engage said pivoted lever to cause the operation of said locking means.

13. In a folding door, a plurality of sections, means for supporting each of said sections for pivotal movement and for movement in the plane of the doorway, and means for locking one of said sections against pivotal movement due to a force applied thereto at a point remote from its point of support while the sections are folded, constructed to release said section automatically as the sections are moved to unfolded position.

14. In a folding door, a plurality of sections, means for supporting said sections for pivotal movement and for movement in the plane of the doorway, and means for preventing transverse movement of that part of a section remote from its point of support when the doors are in folded positions.

Signed at New York city this 8th day of April, 1924.

ARTHUR H. DODGE.